(12) United States Patent
Usuki et al.

(10) Patent No.: US 6,965,002 B2
(45) Date of Patent: Nov. 15, 2005

(54) PROCESS FOR PRODUCING VINYL CHLORIDE-BASED POLYMER

(75) Inventors: Masahiro Usuki, Kashima-gun (JP); Tadashi Amano, Kashima-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 113 days.

(21) Appl. No.: 10/754,567

(22) Filed: Jan. 12, 2004

(65) Prior Publication Data

US 2004/0186257 A1 Sep. 23, 2004

(30) Foreign Application Priority Data

Feb. 6, 2003 (JP) ........................................ 2003-029559

(51) Int. Cl.$^7$ ............................................. C08F 114/06
(52) U.S. Cl. ...................................... 526/63; 526/344.2
(58) Field of Search ................................ 526/63, 344.2

(56) References Cited

U.S. PATENT DOCUMENTS

| | | | |
|---|---|---|---|
| 4,275,244 A | 6/1981 | Helfert et al. | |
| 5,124,074 A | 6/1992 | Uchiyama et al. | |
| 5,807,934 A | 9/1998 | Takahashi et al. | |
| 2002/0169268 A1 * | 11/2002 | Kawakubo et al. | ......... 526/319 |

OTHER PUBLICATIONS

Patent Abstracts of Japan, JP 53–114891, Oct. 6, 1978.

* cited by examiner

*Primary Examiner*—William K. Cheung
(74) *Attorney, Agent, or Firm*—Oblon, Spivak, McClelland, Maier & Neustadt, P.C.

(57) ABSTRACT

A process is provided for producing a vinyl chloride-based polymer by polymerization of vinyl chloride or a monomer mixture containing it in a reaction vessel. Heat generated during polymerization is removed using a reflux condenser. When the polymerization rate is within a range from 30% to 50%, a copolymeric polyether, with a weight average molecular weight of 1,500,000 to 2,000,000, and an ethylene oxide to propylene oxide molar ratio within a range from 78/22 to 82/18, is added to the reaction mass. Foaming of the polymer slurry due to the use of the reflux condenser beyond the point where the polymerization rate reaches 60% is suppressed, and the polymer can be produced with no deleterious effects on the quality of the product polymer.

20 Claims, No Drawings

PROCESS FOR PRODUCING VINYL CHLORIDE-BASED POLYMER

BACKGROUND OF THE INVENTION

1. Field of the Invention

The present invention relates to a process for producing a vinyl chloride-based polymer, and, in particular, relates to a process for producing a vinyl chloride-based polymer in which, when the vinyl chloride-based polymer is produced in a polymerization vessel equipped with a reflux condenser, foaming of the polymerization reaction liquid, which may occur due to heat removal using the reflux condenser is suppressed, enabling production of the target vinyl chloride-based polymer without any deterioration in quality.

2. Description of the Prior Art

In the production of vinyl chloride-based polymers, reduced polymerization times are being developed to improve the productivity. In one such technique, a method is employed in which the polymerization reaction heat is removed using both a polymerization vessel jacket and a reflux condenser, in order to significantly increase the quantity of polymerization reaction heat removed.

However, in those cases where the production of the vinyl chloride-based polymer is conducted via a suspension polymerization in an aqueous medium, and an aqueous material with surface activity (for example, a partially saponified polyvinyl alcohol or a cellulose ether) is used as a dispersant, if heat removal using the reflux condenser is performed beyond a certain level, then a problem arises in that foaming of the polymerization reaction liquid occurs, making it impossible to obtain a polymer of uniform quality with the targeted levels of particle size distribution, porosity and bulk specific gravity.

Furthermore, if the foaming becomes even more severe, then the polymerization reaction liquid may erupt up inside the reflux condenser, causing particles of polymer to become deposited on the inside of the condenser, and these particles may then remix with the reaction liquid, causing, in addition to the problems described above, further deterioration in the quality of the polymer, including an increase in fish eyes and foreign matter within the molded polymer film.

On the other hand, a process for suppressing the foaming associated with heat removal by a reflux condenser by adding an ethylene oxide/propylene oxide copolymeric polyether (number average molecular weight: 2000 to 9000) as an antifoaming agent is already known. Japanese Post-Examination Patent publication (kokoku) No. Sho 57-17003 (JP57-17003B) discloses a process for suppressing foaming of the polymerization reaction liquid, and suppressing any deterioration in quality due to increases in fish eyes and so on, by adding approximately 0.5 to 200 ppm of the above copolymeric polyether based on the vinyl chloride.

However, based on investigations by the inventors of the present invention, it became evident that this process can result in quality deterioration in terms of factors such as the bulk specific gravity and the volume resistivity of the product polymer.

SUMMARY OF THE INVENTION

An object of the present invention is to provide a process for producing a vinyl chloride-based polymer, wherein in those cases where the polymerization reaction is conducted using a reflux condenser in order to increase the quantity of polymerization reaction heat removed, foaming of the polymer slurry beyond the point where the polymerization rate reaches 60% is suppressed, and the vinyl chloride-based polymer can be produced with no deleterious effects on the quality of the product polymer in terms of factors such as the bulk specific gravity and the volume resistivity.

In order to resolve the above problems, the present invention provides a process for producing a vinyl chloride-based polymer which comprises:

polymerizing either a vinyl chloride monomer, or a mixture of a vinyl chloride monomer and another copolymerizable monomer therewith in an aqueous medium in a polymerization vessel equipped with a reflux condenser, removing heat generated in the polymerization, using said reflux condenser, and adding an aqueous solution of an ethylene oxide/propylene oxide copolymeric polyether with a weight average molecular weight of 1,500,000 to 2,000,000, and an ethylene oxide to propylene oxide molar ratio within a range from 78/22 to 82/18, as an antifoaming agent, in a quantity equivalent to 0.001 parts by weight to 0.008 parts by weight in terms of said copolymeric polyether per 100 parts by weight of said vinyl chloride monomer or said monomer mixture, to a polymerization mixture when a polymerization rate is within 30% to 50%.

In a preferred embodiment, in particular, of the process described above, from a point where the polymerization rate reaches 60%, the ratio of the quantity of heat removed, per unit of time, is at least 30%.

DETAILED DESCRIPTION OF THE PREFERRED EMBODIMENTS

As follows is a more detailed description of the present invention.

<Monomer>

The monomer raw material used in the present invention is either vinyl chloride monomer or a monomer mixture containing vinyl chloride monomer as the primary constituent. A monomer mixture containing vinyl chloride monomer as the primary constituent comprises at least 50% by weight, and preferably at least 80% by weight of vinyl chloride monomer, as well as another monomer which is copolymerizable with the vinyl chloride monomer. Examples of other monomers which are copolymerizable with the vinyl chloride monomer include vinyl esters such as vinyl acetate and vinyl propionate; (meth)acrylate esters such as methyl (meth)acrylate and ethyl (meth)acrylate; olefins such as ethylene and propylene; as well as other monomers such as maleic anhydride, acrylonitrile, styrene and vinylidene chloride. These monomers may be used singularly, or in combinations of two or more monomers.

<Antifoaming Agent>

In the present invention, a copolymeric polyether with a weight average molecular weight of 1,500,000 to 2,000,000, and preferably from 1,700,000 to 2,000,000, and an ethylene oxide to propylene oxide molar ratio within a range from 78/22 to 82/18, is used as an antifoaming agent.

If the above molecular weight is less than 1,500,000, then the action of the antifoaming agent in reducing the surface tension of, and thereby destroying, foam that is generated in the polymerization system weakens, and as a result the antifoaming effect becomes inadequate, which requires an increase in the quantity of the antifoaming agent, and effects the quality of the product polymer. Furthermore, if the molecular weight exceeds 2,000,000, then the viscosity of the polymer slurry tends to increase, causing a reduction in the antifoaming effect.

The quantity used of the copolymeric polyether described above is typically within a range from 0.001 to 0.008 parts by weight, and preferably from 0.003 to 0.008 parts by weight, relative to 100 parts by weight of the added vinyl chloride monomer or mixture of vinyl chloride monomer and other monomer(s), and is added to the polymerization reaction system as an aqueous solution.

If the quantity used of the copolymeric polyether relative to the added vinyl chloride monomer is less than 0.001 parts by weight, then the antifoaming effect cannot be generated. Furthermore, if the quantity exceeds 0.008 parts by weight, the viscosity of the polymer slurry increases, causing a reduction in the antifoaming effect.

The copolymeric polyether is added to the polymerization reaction system as an aqueous solution with a concentration that is typically within a range from 0.1 to 10% by weight, and preferably from 0.5 to 3% by weight.

The aforementioned antifoaming agent, namely the copolymeric polyether aqueous solution, must be added when the polymerization rate is within a range from 30% to 50%. If the time of addition is a point prior to the polymerization rate reaching 30%, then the formation of polymer particles is still unsatisfactory, which causes a problem in that the addition has a deleterious effect on the particle size distribution. Furthermore, in the case of a polymerization reaction in which heat removal is performed using a reflux condenser, by the time the polymerization rate has exceeded 50%, foaming of the polymer slurry has already begun, and consequently the antifoaming agent simply adheres to the foam, is unable to adequately penetrate through the entire reaction system, and is less likely to exhibit the required antifoaming effect.

<Heat Removal by the Reflux Condenser>

Once the vinyl chloride monomer (or the vinyl chloride monomer mixture) is placed in the jacketed polymerization reaction vessel, the polymerization reaction is started by supplying hot water to the jacket. Following commencement of the polymerization reaction, cold water is supplied to the jacket, and the polymerization reaction temperature is maintained at a constant level. In addition to the heat removal provided by the jacket, once the polymerization rate has reached approximately 20%, cold water supply to the reflux condenser is started. Then, when the polymerization rate reaches a value exceeding 60%, by ensuring that from that point, the ratio of the quantity of heat removed by the reflux condenser relative to the total quantity of heat removed, per unit of time, is at least 30%, preferably from 30% to 60%, the heat removal efficiency of the polymerization reaction system can be increased effectively.

<Dispersant>

There are no particular restrictions on the dispersant used when either vinyl chloride or a monomer mixture containing vinyl chloride is polymerized in an aqueous medium, and the types of dispersants used in conventional vinyl chloride-based polymer production are suitable. Specific examples of these types of dispersants include water soluble cellulose ethers such as methyl cellulose, hydroxyethyl cellulose, hydroxypropyl cellulose and hydroxypropylmethyl cellulose; water soluble partially saponified polyvinyl alcohols; acrylic acid polymers; water soluble polymers such as gelatin; oil soluble emulsifiers such as sorbitan monolaurate, sorbitan trioleate, glycerin tristearate, and block copolymers of ethylene oxide and propylene oxide; and water soluble emulsifiers such as polyoxyethylene sorbitan monolaurate, polyoxyethylene glycerin oleate and sodium laurate. These dispersants may be used singularly, or in combinations of two or more different dispersants.

<Polymerization Initiator>

In addition, there are no particular restrictions on the polymerization initiator used, and the types of initiators used in conventional vinyl chloride-based polymer production are suitable. Specific examples of these polymerization initiators include peroxycarbonate compounds such as diisopropyl peroxydicarbonate, bis(2-ethylhexyl)peroxydicarbonate and diethoxyethyl peroxydicarbonate; peroxy ester compounds such as tert-butyl peroxypivalate, tert-hexyl peroxypivalate, tert-butyl peroxyneodecanoate and α-cumyl peroxyneodecanoate; peroxides such as acetyl cyclohexylsulfonyl peroxide, 2,4,4-trimethylpentyl-2-peroxyphenoxy acetate and 3,5,5-trimethylhexanoyl peroxide; azo compounds such as azobis(2,4-dimethylvaleronitrile) and azobis(4-methoxy-2,4-dimethylvaleronitrile); as well as potassium persulfate, ammonium persulfate and hydrogen peroxide and the like. These polymerization initiators may be used singularly, or in combinations of two or more different initiators.

Furthermore, there are no particular restrictions on the antioxidants used, and the types of antioxidants typically used in conventional vinyl chloride-based polymer production are suitable. Specific examples of these antioxidants include phenol compounds such as 2,2-bis(4-hydroxyphenyl)propane, hydroquinone, p-methoxyphenol, tert-butyl-hydroxyanisol, octadecyl-3-(3,5-di-tert-butyl-4-hydroxyphenyl)propionate, tert-butylhydroquinone, 2,5-di-tert-butylhydroquinone, 4,4'-butylidene-bis(3-methyl-6-tert-butylphenol), 3,5-di-tert-butyl-4-hydroxytoluene, 2,2'-methylene-bis(4-ethyl-6-tert-butylphenol), triethylene glycol-bis[3-(3-tert-butyl-5-methyl-4-hydroxyphenyl) propionate], pentaerythrityl-tetrakis[3-(3,5-di-tert-butyl-4-hydroxyphenyl)propionate], 2,6-di-tert-butyl-4-sec-butylphenol, 2,6-di-tert-butyl-4-methylphenol, 4-tert-butylcatechol, 4,4'-thiobis(6-tert-butyl-m-cresol), tocopherol and nordihydroguaiaretic acid; semicarbazide derivatives such as semicarbazide, 1-acetylsemicarbazide, 1-chloroacetylsemicarbazide, 1-dichloroacetylsemicarbazide, 1-benzoylsemicarbazide and semicarbazone; thiocarbazide derivatives such as carbohydrazide, thiosemicarbazide and thiosemicarbazone; amine compounds such as N,N'-diphenyl-p-phenylenediamine and 4,4'-bis(2,4-dimethylbenzyl) diphenylamine; nitro and nitroso compounds such as 4-nitroanisol, N-nitrosodiphenylamine, 4-nitroaniline and the aluminum salt of N-nitrosophenylhydroxylamine; phosphorus compounds such as triphenyl phosphite, diphenylisodecyl phosphite, phenyldiisodecyl phosphite, 4,4'-butylidene-bis(3-methyl-6-tert-butylphenyl-di-tridecylphosphite), cyclic neopentane tetraylbis(octadecyl phosphite), tris(nonylphenyl)phosphite and tris (dinonylphenyl)phosphite; unsaturated hydrocarbon compounds such as styrene, 1,3-hexadiene and α-methylstyrene; and sulfur compounds such as dilauryl thiodipropionate, dimyristyl thiodipropionate, distearyl thiodipropionate, dodecylmercaptan and 1,3-diphenyl-2-thiourea.

Of these, from the viewpoints of achieving good anti-initial discoloration (the property wherein the polymer is resistant to coloring when subjected to mold processing), and limiting scale adhesion to the polymerization vessel, 3,5-di-tert-butyl-4-hydroxytoluene, triethylene glycol-bis[3-(3-tert-butyl-5-methyl-4-hydroxyphenyl)propionate], tert-butylhydroxyanisol, tert-butylhydroquinone, 2,6-di-tert-butyl-4-sec-butylphenol and octadecyl-3-(3,5-di-tert-butyl- 4-hydroxyphenyl)propionate are preferred. These antioxidants can be used singularly, or in combinations of two or more compounds.

<Other Optional Components>

In the present invention, where necessary, other components typically used in the production of vinyl chloride-based polymers such as polymerization degree regulators, chain transfer agents, gelation improver, and antistatic agents may also be used. Furthermore, antioxidants may be added to the polymerization system prior to commencement of the polymerization, during the polymerization, or following completion of the polymerization, for purposes such as controlling the polymerization reaction or preventing deterioration of the product polymer.

<Other Conditions>

Other conditions associated with the polymerization, such as the method of supplying the aqueous medium, the vinyl chloride monomer or the monomer mixture containing vinyl chloride monomer, the dispersant and the polymerization initiator and the like to the polymerization vessel, the relative proportions of materials, and the polymerization temperature may be similar to conventional methods.

EXAMPLES

As follows is a more detailed description of the present invention using a series of examples, although the present invention is in no way limited to the examples presented.

The polymerization rates were referenced against results that were obtained in advance by conducting polymerizations and determining the relationship between the polymerization time and the polymerization rate.

In other words, a predetermined quantity of deionized water, and a predetermined quantity of a predetermined type of dispersant were combined in a stainless steel polymerization vessel with an internal capacity of 2 m$^3$, the inside of the polymerization vessel was subsequently degassed until the internal pressure reached 8 kPa·abs (60 mmHg), and a predetermined quantity of vinyl chloride monomer was then added. Subsequently, with the mixture undergoing constant stirring, a predetermined quantity of a predetermined type of polymerization initiator was added, the temperature was raised, and when the temperature inside the polymerization vessel reached 57.0° C., that temperature was maintained and the polymerization was allowed to proceed.

One hour after the temperature raising process had been started, a 10% by weight aqueous solution of sodium nitrite was added to completely halt the polymerization, and any unreacted monomer was recovered. The total weight of the vinyl chloride polymer obtained by dewatering and drying the polymer slurry was weighed, and the polymerization rate at the point 1 hour after the start of the temperature raising process was determined from the following formula.

Polymerization rate (%) 1 hour after start of temperature raising process=(quantity of the dried vinyl chloride polymer/quantity of the added vinyl chloride monomer)×100

In a similar manner, the polymerization rates at subsequent 30 minute intervals, namely at 1.5, 2, 2.5, 3, 3.5, 4, 4.5 and 5 hours after the start of the temperature raising process, were calculated, and the relationship between the polymerization time and the polymerization rate was determined.

This relationship between the polymerization time and the polymerization rate was generated for each quantity of each of the required polymerization initiators, and for each predetermined polymerization temperature.

Similarly, in those cases in which a copolymer was produced from vinyl chloride monomer and another copolymerizable monomer, the relationship between the polymerization time and the polymerization rate was determined in advance, in the same manner as described above.

Example 1

In a stainless steel polymerization reaction vessel of internal capacity 2 m$^3$, equipped with a reflux condenser and electrocapacitance type foam sensors, were placed 980 kg of deionized water, 382 g of a partially saponified polyvinyl alcohol with a saponification degree of 80.5 mol % and 143 g of hydroxypropylmethyl cellulose with a methoxy substitution of 28.5% by weight and a hydroxypropyl substitution of 8.9% by weight. Subsequently, the inside of the polymerization vessel was degassed until the internal pressure reached 8 kPa·abs (60 mmHg), and 700 kg of vinyl chloride monomer was then added. With the mixture undergoing constant stirring, 350 g of bis(2-ethylhexyl) peroxydicarbonate was added as a polymerization initiator, while a temperature raising process was started by passing hot water through the jacket, and once the temperature inside the polymerization reaction vessel reached 57.0° C., the polymerization was allowed to proceed with the temperature maintained at this level. Subsequently, when the polymerization rate reached 30%, cold water supply to the reflux condenser was started, and the quantity of heat removed by the reflux condenser was increased until it reached 250 mJ/hr when the polymerization rate reached 40%, and that quantity of heat removal was then maintained while the reaction was allowed to proceed.

Subsequently, when the polymerization rate reached 50%, 1.75 kg of a 2% aqueous solution of a copolymeric polyether with a weight average molecular weight of 1,500,000 and an ethylene oxide to propylene oxide molar ratio of 80/20 (brand name: CP2000, manufactured by Sumitomo Seika Chemicals Co., Ltd.) was added as an antifoaming agent. The maximum value for the ratio of the quantity of heat removed by the reflux condenser relative to the total quantity of heat removed, per unit of time, was 55%, which occurred at a polymerization rate of 75%. With the above level of heat removal maintained, reaction was continued until the pressure inside the polymerization vessel fell to 0.588 MPa·G (4,410 mmHg) (polymerization rate 86%), and 700 g of a 30% aqueous dispersion of triethylene glycol-bis[3-(3-tert-butyl-5-methyl-4-hydroxyphenyl)propionate] was then added to the polymerization vessel, followed by recovery of the unreacted monomer. Following the addition of 200 g of 25% ammonia water to the thus obtained polymer slurry to adjust the pH, the polymer slurry was dewatered and dried, yielding a vinyl chloride-based polymer.

The #100 pass quantity (weight %), the bulk specific gravity, the volume resistivity and the foam level for the thus obtained polymer are shown in Table 1.

Comparative Examples 1 to 3

A polymerization reaction was conducted in a similar manner to the example 1, with the exception that when the polymerization rate reached 50%, an antifoaming agent with the weight average molecular weight and the molar ratio shown in Table 1 was added to the polymerization system in the quantity shown in the table.

The antifoaming agents used in the example and the comparative examples, together with the particle size (#100 pass quantity (weight %)), the bulk specific gravity, the volume resistivity, and the foam level for the polymers obtained from the respective polymerizations, are shown in Table 1.

<Antifoaming Agent Composition and Polymerization Results>

TABLE 1

|  | Example 1 | Comparative Example 1 | Comparative Example 2 | Comparative Example 3 |
|---|---|---|---|---|
| Antifoaming agent (ethylene oxide/propylene oxide copolymeric polyether) |  | None |  |  |
| Weight average molecular weight | 1,500,000 |  | 4000 | 4000 |
| Quantity added (parts by weight/VCM*100 parts by weight) | 0.005 |  | 0.005 | 0.02 |
| ethylene oxide/propylene oxide (mol %/mol %) | 80/20 |  | 85/15 | 85/15 |
| particle size (#100 pass quantity (weight %) | 30.8 | 35.5 | 30.3 | 27.5 |
| Bulk specific gravity (g/ml) | 0.524 | 0.519 | 0.545 | 0.555 |
| Volume resistivity ($\Omega \cdot cm$) | $4 \times 10^{13}$ | $4 \times 10^{13}$ | $1 \times 10^{13}$ | $3 \times 10^{12}$ |
| Foam level (vertical distance above the liquid surface when polymerization rate is 60%) | not higher than 20 cm | 60 cm or higher | approximately 20 cm | not higher than 20 cm |

(Note)
*In the table, VCM represents vinyl chloride monomer.

[Evaluation Methods]

Foam Level

As the foam sensors were used electrocapacitance type liquid level sensors (diameter of the sensor section 13 mm, made of SUS304). With the height of the liquid surface at the point where the polymerization rate of the vinyl chloride-based polymer was 60% as a reference, sensors were attached at three positions, at vertical distances of 20 cm, 40 cm and 60 cm respectively above this liquid surface (Incidentally, the distance from the liquid surface to the top of the inner wall surface of the polymerization vessel was 80 cm), such that they project for a length of 5 cm in a horizontal direction from the inner wall surface towards the center of the vessel. These foam sensors output a voltage when contacted by foam. The presence of foam contact is output as a voltage, and if no foam is in contact with the sensor, the voltage is zero.

Particle Size (#100 Pass Quantity (Weight %))

Using the particle size distribution measurement method of JIS Z8801, the weight % of the sample which passed through a #100 sieve was determined.

Bulk Specific Gravity

This property was measured in accordance with JIS K6721.

Volume Resistivity

A sheet of thickness 1 mm formed by mixing 100 g of the polymer, 50 g of dioctyl phthalate (DOP), 3 g of a lead-based stabilizer, and 1 g of barium stearate (Ba—St), and then rolling the mixture at 145° C., was used to prepare a test piece by further molding using a 165° C.×45 KG press to generate a plate of thickness 10 mm, and this test piece was then tested in accordance with the volume resistivity measurement method of JIS K6723.

<Evaluation>

In the comparative example 1, because an antifoaming agent is not used, the foam level is high, and exceeds 60 cm. In the comparative example 2, the antifoaming effect is inadequate, and the volume resistivity is low. Furthermore, in the comparative example 3, although the antifoaming effect is satisfactory, the particle size of the product polymer is comparatively large, and the volume resistivity is markedly lower.

According to the present invention, when a vinyl chloride monomer, or a vinyl chloride monomer and a copolymerizable monomer are polymerized in an aqueous medium inside a polymerization vessel equipped with a reflux condenser, thereby producing a vinyl chloride-based polymer, a vinyl chloride-based polymer of stable quality can be produced with essentially no foaming of the polymerization reaction liquid.

What is claimed is:

1. A process for producing a vinyl chloride-based polymer which comprises:

polymerizing either a vinyl chloride monomer, or a mixture of a vinyl chloride monomer and another copolymerizable monomer therewith in an aqueous medium in a polymerization vessel equipped with a reflux condenser, removing heat generated in the polymerization, using said reflux condenser, and adding an aqueous solution of an ethylene oxide/propylene oxide copolymeric polyether with a weight average molecular weight of 1,500,000 to 2,000,000, and an ethylene oxide to propylene oxide molar ratio within a range from 78/22 to 82/18, as an antifoaming agent, in a quantity equivalent to 0.001 parts by weight to 0.008 parts by weight in terms of said copolymeric polyether per 100 parts by weight of said vinyl chloride monomer or the monomer mixture, to a polymerization mixture when a polymerization conversion is within 30% to 50%.

2. The process according to claim 1, wherein from a point where said polymerization conversion reaches 60%, a ratio of a quantity of heat removed by said reflux condenser relative to a total quantity of heat removed, per unit of time, is at least 30%.

3. The process according to claim 2, wherein said ratio of a quantity of heat removed by said reflux condenser is in a range of 30 to 60%.

4. The process according to claim 1, wherein said copolymeric polyether has a weight average molecular weight of 1,700,000 to 2,000,000.

5. The process according to claim 1, wherein said aqueous solution of said copolymeric polyether has a concentration within a range from 0.1 to 10% by weight.

6. The process according to claim 1, wherein said aqueous solution of said copolymeric polyether has a concentration within a range from 0.5 to 3% by weight.

7. The process according to claim 1, wherein said aqueous solution of said copolymeric polyether is added in a quantity equivalent to 0.003 parts by weight to 0.008 parts by weight in terms of said copolymeric polyether per 100 parts by weight of said vinyl chloride monomer or said monomer mixture.

8. The process of claim 1, wherein said monomer mixture comprises at least 50% by weight vinyl chloride monomer, and at least one another copolymerizable monomer.

9. The process of claim 1, wherein said monomer mixture comprises at least 80% by weight vinyl chloride monomer, and at least one another copolymerizable monomer.

10. The process of claim 8, wherein another copolymerizable monomer is selected from the group consisting of vinyl esters, (meth)acrylate esters, maleic anhydride, acrylonitrile, styrene, vinylidene chloride, and the mixtures thereof.

11. The process of claim 10, wherein said vinyl esters are selected from the group consisting of vinyl acetate, vinyl propionate, and a mixture thereof.

12. The process of claim 10, wherein said (meth)acrylate esters are selected from the group consisting of methyl (meth)acrylate, ethyl (meth)acrylate, and a mixture thereof.

13. The process of claim 1, further comprising adding at least one dispersant to the polymerization mixture.

14. The process of claim 13, wherein said dispersant is selected from the group consisting of water soluble cellulose ethers, water soluble partially saponified polyvinyl alcohols, acrylic acid polymers, water soluble polymers, oil soluble emulsifiers, water soluble emulsifiers, and the mixtures thereof.

15. The process of claim 14, wherein said water soluble cellulose ethers are selected from the group consisting of methyl cellulose, hydroxyethyl cellulose, hydroxypropyl cellulose, hydroxypropylmethyl cellulose, and the mixtures thereof.

16. The process of claim 14, wherein said water soluble polymers are gelatin.

17. The process of claim 14, wherein said oil soluble emulsifiers are selected from the group consisting of sorbitan monolaurate, sorbitan trioleate, glycerin tristearate, block copolymers of ethylene oxide and propylene oxide, and the mixtures thereof.

18. The process of claim 14, wherein said water soluble emulsifiers are selected from the group consisting of polyoxyethylene sorbitan monolaurate, polyoxyethylene glycerin oleate, sodium laurate, and the mixtures thereof.

19. The process of claim 1, further comprising adding at least one polymerization initiator to the polymerization mixture.

20. The process of claim 19, wherein said polymerization initiator is selected from the group consisting of peroxycarbonate compounds, peroxy ester compounds, peroxides, azo compounds, potassium persulfate, ammonium persulfate, hydrogen peroxide, and the mixtures thereof.

* * * * *